United States Patent
Dagan et al.

(10) Patent No.: US 10,183,243 B2
(45) Date of Patent: Jan. 22, 2019

(54) MICRONIC AUTOMATIC FILTER

(71) Applicant: Filter Safe LTD, Tefen Ind. Zone (IL)

(72) Inventors: Etai Dagan, Kfar Vradim (IL); Nir Oz, M.P. Misgav (IL); Anat Weisbrod, M.P. Misgav (IL)

(73) Assignee: FILTER SAFE LTD, Tefen Ind. Zone (IL)

( * ) Notice: Subject to any disclaimer, the term of this patent is extended or adjusted under 35 U.S.C. 154(b) by 577 days.

(21) Appl. No.: 14/793,758

(22) Filed: Jul. 8, 2015

(65) Prior Publication Data

US 2017/0007947 A1 Jan. 12, 2017

(51) Int. Cl.
*B01D 29/33* (2006.01)
*B01D 29/68* (2006.01)
*B01D 39/08* (2006.01)
*C02F 1/00* (2006.01)

(52) U.S. Cl.
CPC .......... *B01D 29/33* (2013.01); *B01D 29/682* (2013.01); *B01D 29/688* (2013.01); *B01D 39/08* (2013.01); *C02F 1/004* (2013.01)

(58) Field of Classification Search
CPC .. B01D 29/33; B01D 29/0097; B01D 29/682; B01D 29/688; B01D 39/08; C02F 1/004
See application file for complete search history.

(56) References Cited

U.S. PATENT DOCUMENTS

| 5,804,075 A * | 9/1998 | Aikawa ................. D21D 5/16 162/357 |
| 2006/0231486 A1* | 10/2006 | Morgan ................. B01D 39/04 210/505 |
| 2007/0199855 A1* | 8/2007 | Lim ..................... B65D 65/406 206/523 |
| 2013/0008847 A1* | 1/2013 | Zur ....................... B01D 29/111 210/485 |

FOREIGN PATENT DOCUMENTS

EP 1785178 A1 * 5/2007
WO WO 2006/008729 A1 * 1/2006

* cited by examiner

*Primary Examiner* — John Kim
(74) *Attorney, Agent, or Firm* — Mark M. Friedman

(57) ABSTRACT

A filtering member is provided including a frame defining a fluid path between an outer face of the frame and an inner face thereof, the fluid path includes a first and a second protruding portions extending between the outer face and the inner face defining a filtering volume therebetween, at least one of the first and a second protruding portions is tapered such that a cross section of the filtering volume increases towards the inlet face; a filtering media disposed in the filtering volume and configured such that when fluid flows from the outer face towards the inner face density of the filtering media is higher than density thereof when fluid flows from the inner face towards the outer face.

19 Claims, 7 Drawing Sheets

MICRONIC AUTOMATIC FILTER

FIELD OF INVENTION

The presently disclosed subject matter relates to a filtering apparatus, in general, and in particular to a filtering apparatus having a cleaning mechanism.

BACKGROUND

The present invention relates to self-cleaning filtration systems. There are known filtration screens configured to allow fluid flow therethrough while precluding flow of undesirable elements, such as sand, organic matter, etc.

An example of filtration screens is a wedge wire screen which is a welded steel structure, used for filtration and separation. The wedge wire includes a surface profiles, usually V-shaped, that are resistance welded onto support profiles. The distance between the surface profiles is controlled, as it forms the slot through which the filtrate flows.

The direction of the flow is determined by the position of the surface profiles in relation to the support profiles. Wedge wire screens are either flow-out-to-in (FOTI) or flow-in-to-out (FITO)

Cleaning of a filtration screen used for the filtration of water can be difficult. The lower the size of the pores in the filter the more difficult it is to remove the trapped suspended solids that have accumulated and imbedded on the filtration screen. Organic matter tends to stick to the filtration screen making removal especially difficult.

Some examples of attempts to increase the efficiency of cleaning a filtration screen include:

Nozzles that are fixed on the suction pipe collector at a preset distance from the filtration screen without an ability to move closer and further from the filtration screen.

Patent application WO 2006/008729 discloses "The nozzle 34 comprises a nozzle pipe 44 and nozzle cap 46 with an annular rim 47. The tubular basis 40 is closed by a cover 48. The nozzle pipe 44 is supported in the tubular basis 50 by an annular guide 50 and an opening in the cover 48 so as to form an axially movable telescope joint. The cylinder spring 42 urges the nozzle pipe 44 axially towards the inlet surface of the mesh 20." Furthermore, "the telescope joint and the spring 42 are protected from the harmful particles by two tight sealing rings 52 and 54".

Patent application EP 1785178 discloses a "nozzle 230 moves along guide 210, or at least along upper portion 212, while extending towards the inner part of fine filter 40." Further, "During the backwash operation fluid flows through the final filtering chamber 30 toward the space defined within nozzle 240. Due to this flow the outer edge 242 of nozzle 240 is pushed away from the fine filter 40 while the inner edge is pushed towards the fine filter. Because the area of the inner edge 244 is larger than the area of the outer edge 242 of nozzle 240 the overall effect of the fluid flow is to push nozzle 240 towards the inner face of fine filter 40."

SUMMARY OF INVENTION

There is provided in accordance with an aspect of the presently disclosed subject matter a filtering member including a frame defining a fluid path between an outer face of the frame and an inner face thereof, the fluid path includes a first and a second protruding portions extending between the outer face and the inner face defining a filtering volume therebetween, at least one of the first and a second protruding portions is tapered such that a cross section of the filtering volume increases towards the inlet face; a filtering media disposed in the filtering volume and configured such that when fluid flows from the outer face towards the inner face density of the filtering media is higher than density thereof when fluid flows from the inner face towards the outer face.

The cross section can include a trapezoid shape having a short base disposed adjacent the inner face and a long base disposed adjacent the inlet face, such that the filtering volume expands towards the inlet face.

The filtering member can further include an elongated member having a circumferential wall defining an inner volume therein.

Each of the first and a second protruding portions can be a wedge member.

The frame can include a plurality of wedge members each of which defining a first and a second protruding portions coupled to one another and extending between the outer face and the inner face such that each of the filtering volume can be delimited by a first protruding portion of one wedge member and a second protruding portion of an adjacent wedge member.

The wedge member can be a threaded wedge wire formed about the frame, being configured to allow winding elongated fibers inside the filtering area.

At least one of the first and a second protruding portions can be sloped in a direction between the outer face and the inner face of the filtering member.

The filtering volume can include a cross section having a trapezoid shape with a short base thereof disposed adjacent the inner face a long base thereof disposed adjacent the outer face, such that the filtering volume expands towards the outer face.

The filtering media can include a plurality of fibers winded around the filtering member, between the first protruding portions and the second protruding portion.

The filtering media can be so disposed inside the filtering volume, such that when the filtering media can be highly dense the filtering media does not occupy the entire filtering volume.

Filtering properties of the filtering media can be configured to vary depending on the density thereof inside said filtering volume.

A wall of the first protruding portion and the second protruding portion can include a rough surface configured to hinder fluid flow thereon.

The filtering member can be further configured to operate in an inlet state wherein pressure at said outer face can be higher than that at said inner face, such that said filtering media can be urged towards the inner face, and in an outlet state wherein pressure at the outer face can be lower than that at the inner face such that the filtering media can be urged towards the outer face allowing dirt particles inside the filtering volume to be washed out of the filtering volume.

A width of the fluid path at the inner face can be determined in accordance with the density of the filtering media required during the inlet state. A width of the fluid path at the outlet face can be determined in accordance with the density of the filtering media required during the outlet state.

There is provided in accordance with a further aspect of the presently disclosed subject matter a filtering apparatus having housing in fluid communication with an inlet port and an outlet port. The apparatus includes a filtering member disposed inside the housing and including a frame defining a fluid path between an outer face of the frame and an inner face thereof, the fluid path includes a first and a second protruding portions extending between the outer face and the inner face defining a filtering volume therebetween, at least one of the first and a second protruding portions can be tapered such that a cross section of the filtering volume increases towards the inlet face; and a filtering media disposed in the filtering volume and configured such that when fluid flows from the outer face towards the inner face density of the filtering media can be higher than density thereof when fluid flows from the inner face towards the outer face, wherein the filtering member can be so disposed inside the housing such configured to allow fluid flow from the inlet port through the outer face of the filtering member towards the inner face thereof and to the outlet port.

The filtering member can be an elongated member having a circumferential wall defining an inner volume the filtering member can be so disposed inside the housing such that fluid from the inlet port flows through the circumferential wall into the inner volume.

The filtering apparatus can further include a drive configured for rotating the filtering member inside the housing.

The filtering apparatus can further include at least one cleaning valve mounted on the housing, wherein the filtering member can be so disposed inside the housing such that fluid can flow from the inner volume of the filtering member through the inner face and the outer face into the cleaning valve, such that dirt inside the filtering volume can be urged towards the cleaning valves.

The at least one cleaning valve can include a plurality of cleaning valves mounted along the length of the housing.

The at least one cleaning valve can include a tube coupled to a pressure sink at a distal side thereof, a nozzle, and a resilient element which couples the nozzle to a proximal side of the tube, and a deformable housing which bridges a gap between the proximal side of the tube and the nozzle.

BRIEF DESCRIPTION OF THE DRAWINGS

In order to understand the disclosure and to see how it may be carried out in practice, embodiments will now be described, by way of non-limiting examples only, with reference to the accompanying drawings, in which.

DETAILED DESCRIPTION OF EMBODIMENTS

Figure 1A:
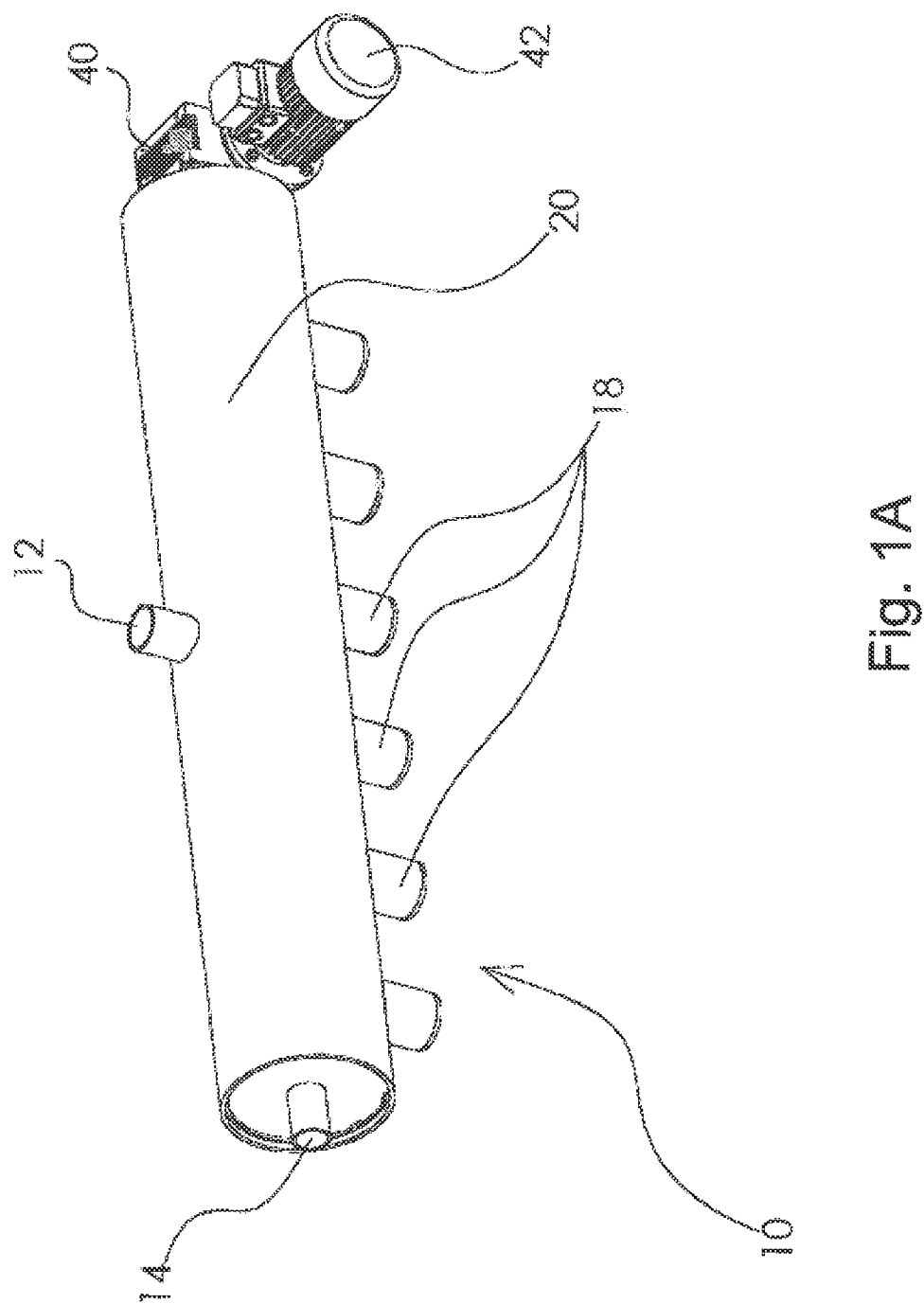
FIG. 1A is a perspective view of a filtering apparatus in accordance with an example of the presently disclosed subject matter.
Figure 1B:
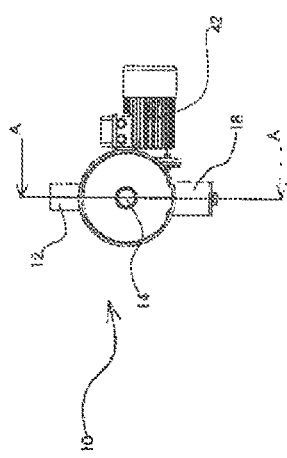
FIG. 1B is a side view of a filtering apparatus of FIG. 1A.
Figure 1C:
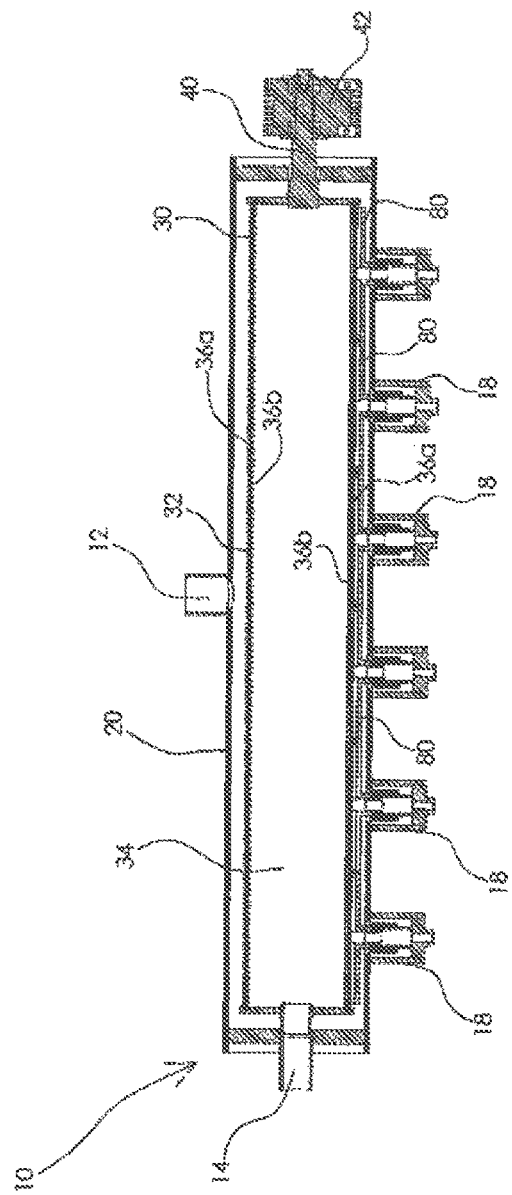
FIG. 1C is a side sectional view of a filtering apparatus of FIG. 1A, taken along line A-A.
Figure 1D:
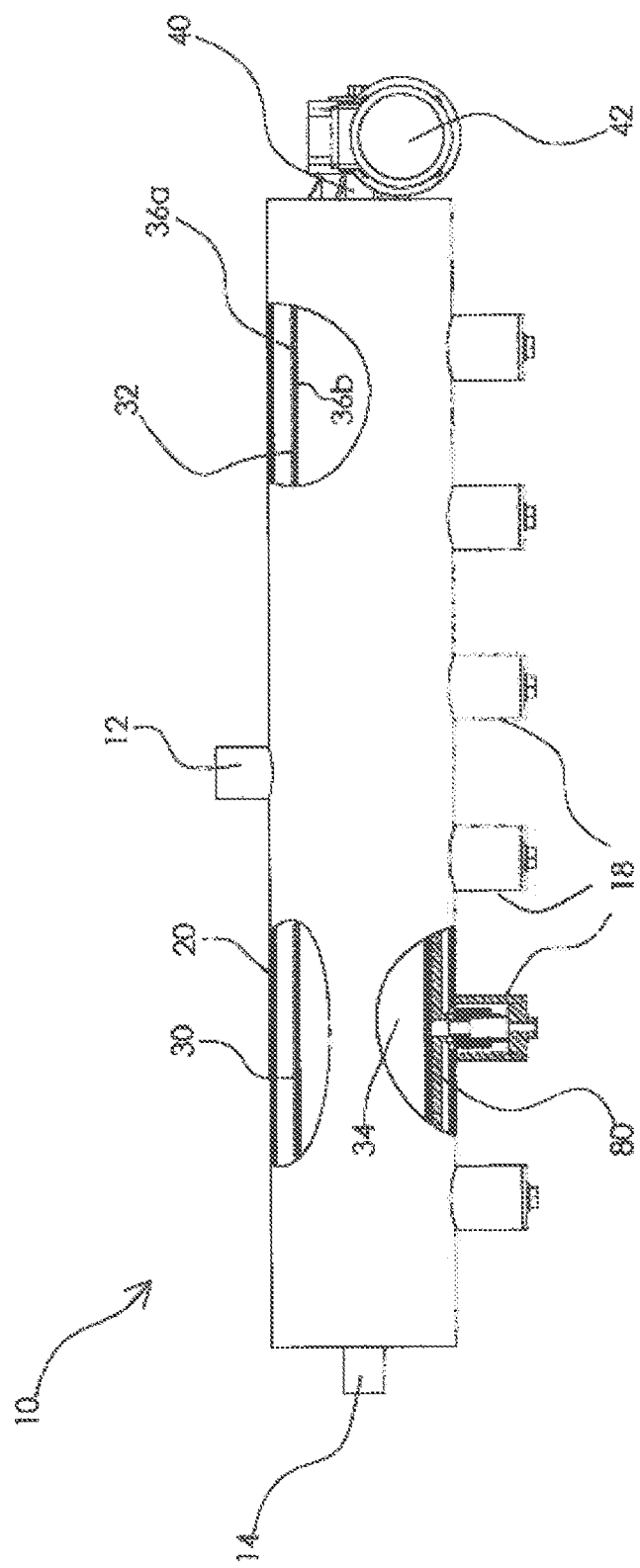
FIG. 1D is a side partially cutaway view of a filtering apparatus of FIG. 1A.

FIGS. 1A to 1D is a filtering apparatus 10 for filtering fluids flowing between an inlet port 12 and an outlet port 14. The filtering apparatus 10 according to the illustrated example includes an elongated housing 20, a filtering member 30 disposed in the housing 20 and at least one cleaning valve 18.

The filtering member 30 can be an elongated member having a circumferential wall 32, defining an inner volume 34. The filtering member 30 is so disposed inside the housing 20 such that fluid from the inlet port 12 flows through the circumferential wall 32 of filtering member 30 into the inner volume 34.

Thus, the inlet port 12 is defined at the circumference of the housing 20, such that fluid flow therethrough is directed towards the circumferential wall 32 of the filtering member 30. The outlet port 14 on the other hand, is defined on a side face of the housing 20 such that filtered fluid from the inner volume 34 of the filtering member 30 can flow towards the outlet port 14.

According to the illustrated example the housing 20 includes a cylindrical wall, the filtering member 30 includes a corresponding cylindrical wall having a diameter smaller than that of the housing 20, such that the filtering member 30 can be disposed inside the housing and fluid from the inlet can enter the housing and flow in the space between an inner surface of the housing 20 and an outer face 36a of the filtering member 30.

The filter apparatus 10 can further includes a drive 40 configured for rotating the filtering member 30 inside the housing 20. For example the drive 40 can include a shaft on which the filtering member 30 is mounted and being configured to rotate thereby rotate the filtering member 30 therewith. This way, the entire circumference of the circumferential wall 32 of filtering member 30 is active in filtering fluid from the inlet port 12. The rotation of the filtering member 30 further facilitates the cleaning of the entire circumference of the circumferential wall 32. The drive 40 can be provided with a motor 42, which can be configured for continuous or monitored operation.

According to the illustrated example the apparatus 10 includes a plurality of cleaning valves 18 mounted on the circumferential wall of the housing 20. The cleaning valves 18 are configured to allow fluid flow from the inner volume 34 of the filtering member 30 out of the apparatus 10. The fluid flows from the inner volume 34 of the filtering member 30 through the circumferential wall 32 thereof urges dirt accumulated on the filtering member 30 towards the cleaning valves 18.

It is appreciated that the cleaning valves 18 can be mounted along the length of the housing 20 such that the entire length of the filtering member is cleaned. In addition, the rotation of the filtering member 30 by the drive 40 allows cleaning of the entire circumference of the circumferential wall 32.

Figure 2A:
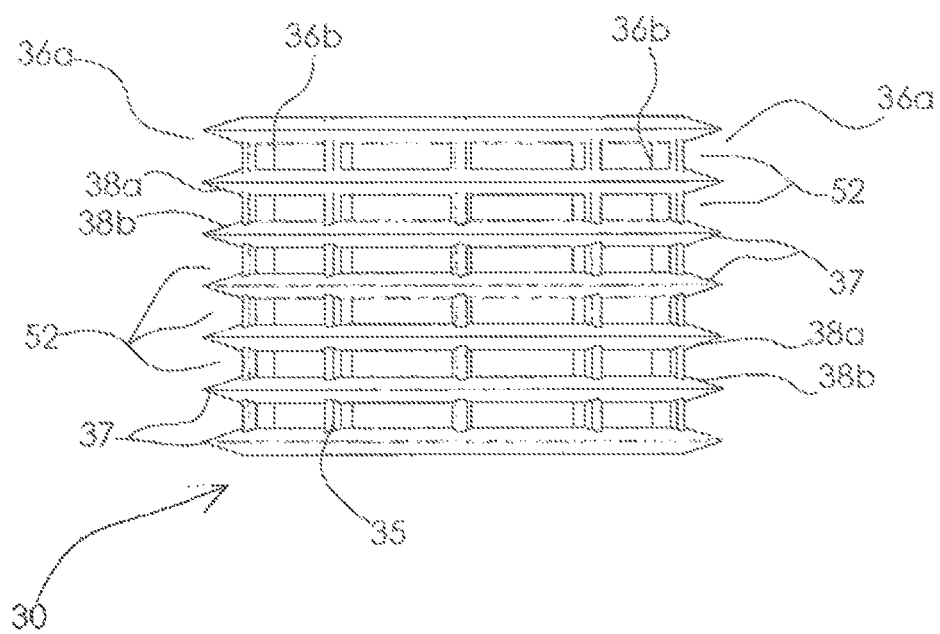
FIG. 2A is a side view of a frame of a filtering member in accordance with an example of the presently disclosed subject matter.

Attention is now made to FIG. 2A, the filtering member 30 can include a frame 35 having a plurality of wedge members 37 defining an outer face 36a of the filtering member 30 and an inner face 36b thereof. A filtering volume 52 is defined between a pair of wedge members 37 and is in fluid communication with the outer face 36a of the filtering member 30 and an inner face 36b thereof. This way wedge members 37 define a plurality of the fluid paths. Each wedge member 37 defines a first and a second protruding portions 38a and 38b coupled to one another and extending between the outer face 36a and the inner face 36b. Thus, each filtering volume 52 is delimited by a first protruding portion 38a on one side thereof and second protruding portion 38b on the opposing side thereof.

According to the present example the first and a second protruding portions 38a and 38b are sloped such that a cross section of said filtering volume increases towards the outer face 36a. That is to say, the first and second protruding portions 38a and 38b are sloped in a direction towards the inner volume 34 of the filtering member 30. Since the first protruding portions 38a of each of the filtering volumes 52 is disposed opposite the second protruding portion 38b of that filtering volume 52 the sloping direction of the first protruding portions 38a is opposite the sloping direction of the second protruding portion 38b. Accordingly, each filtering volume 52 includes a cross section having a trapezoid shape with a short base thereof disposed adjacent the inner face 36b of the filtering member 30 and a long base thereof disposed adjacent the outer face 36a, such that the filtering volume 52 expands towards the outer face 36a.

The filtering member 30 further includes a filtering media (not shown) disposed in the filtering volume 52, for example, a plurality of fibers winded around the filtering member 30, between the first protruding portions 38a and the second protruding portion 38b. The filtering media is so disposed inside the filtering volume 52, such that when the filtering media is highly dense the filtering media does not occupy the entire filtering volume. This way, the filtering media can be scattered inside the filtering volume 52 with a relatively low density. This way, the filtering properties of the filtering media varies depending on the density of the filtering media inside the filtering volume 52. In addition the varying density of the filtering media inside the filtering volume 52 allows particles to either be entrapped therein or otherwise be washed out as explained hereinafter in detail.

Figure 3A:
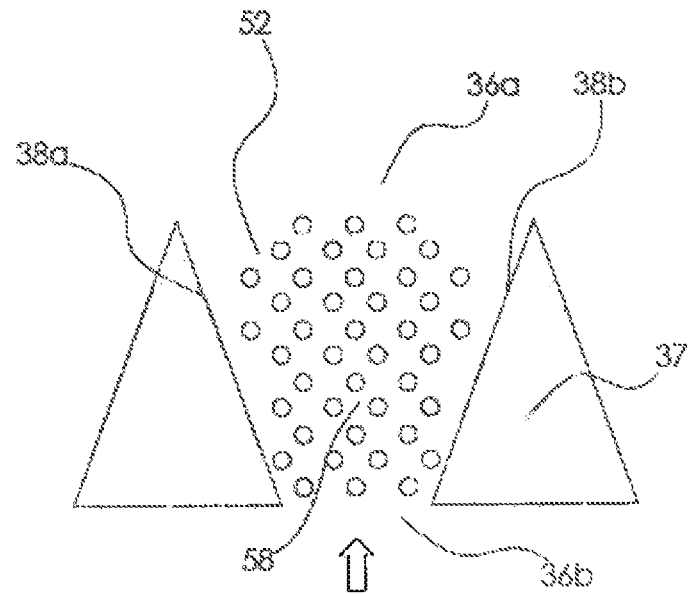
FIG. 3A is a schematic diagram of a single filtering volume of the filtering member in accordance with an example of the presently disclosed subject matter, in the outlet state thereof.
Figure 3B:
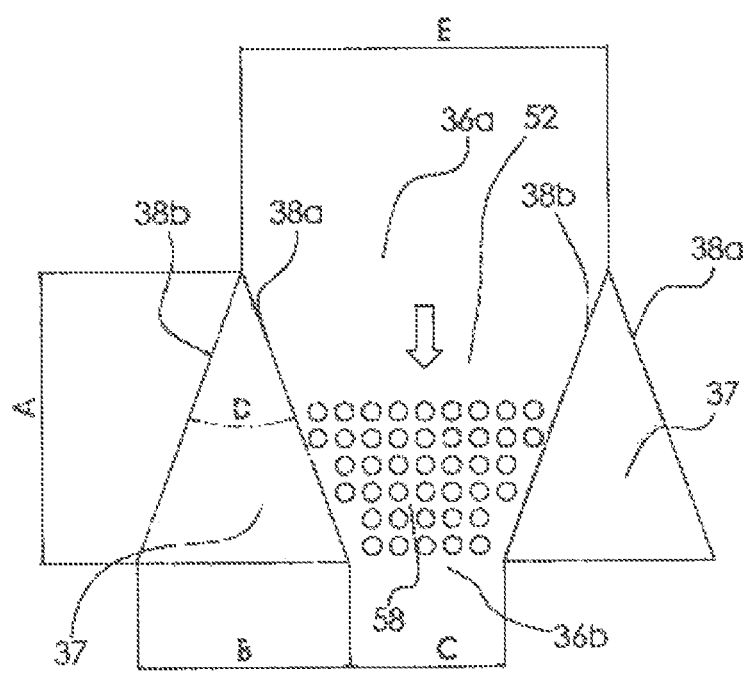
FIG. 3B is a schematic diagram of a single filtering volume of the filtering member in accordance with an example of the presently disclosed subject matter in the inlet state thereof.

Attention is now made to FIGS. 3A and 3B, due to the trapezoid shaped cross section of the filtering volume 52, when fluid flows from the outer face 36a of the filtering member 30 towards the inner face 36b thereof (FIG. 3B), the density of the filtering media 58 inside the filtering volume 52 is higher than the density thereof when fluid flows in the opposite direction i.e. from the inner face 36b towards the outer face 36a thereof (FIG. 3A).

That is to say, during the inlet state of the filter member 30, when the pressure gradient across the filtering member 30 is positive i.e. the pressure at the outer face 36a is higher than that at the inner face 36b, the filtering media 58 is urged towards the inner face 36b to the area of the filtering volume 52 where the cross section is narrow. As a result, the filtering media 58 is dense such that dirt particles in the fluid flow therethrough are entrapped thereby, for example by the fibers.

During the outlet state of the filter member 30, on the other hand, when the pressure gradient across the filtering member 30 is negative i.e. the pressure at the outer face 36a is lower than that at the inner face 36b, the filtering media 58 is urged towards the outer face 36a to the area of the filtering volume 52 where the cross section is relatively large. As a result, the filtering media 58 is scattered along a relatively larger area such that dirt particles entrapped between the filtering elements, such as the fibers, can be washed out of the filtering volume 52.

Figure 2B:
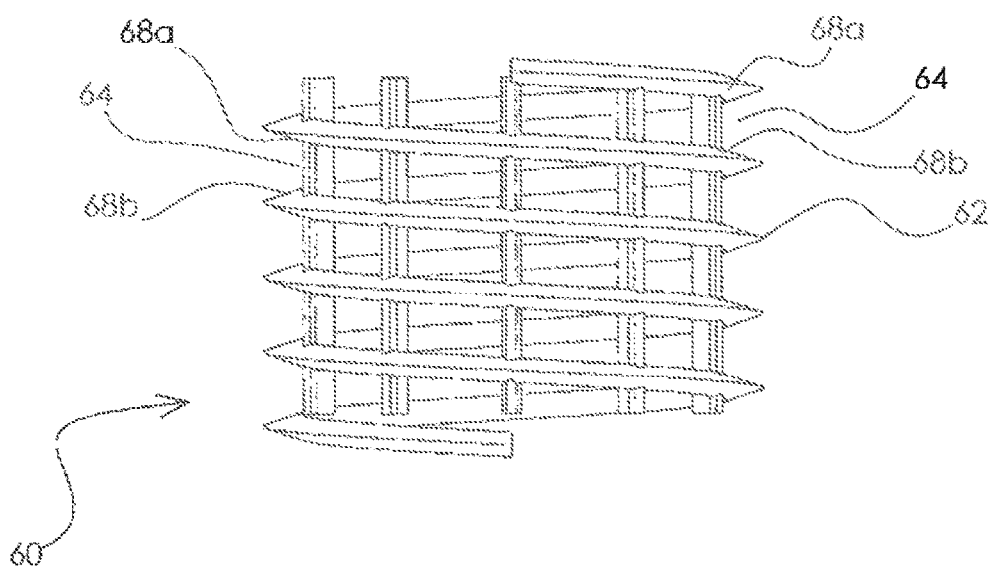
FIG. 2B is a side view of a frame of a filtering member in accordance with another example of the presently disclosed subject matter.

According to an example the first protruding portion 38a and the second protruding portion 38b can include a rough surface, such as a plurality of grooves, and protrusions configured to hinder the fluid flow thereon. That is to say, the rough surface is configured such that the water flow through the filtering volume 52 generally tends to be directed through the filtering media as opposed to between the filtering media and the wall of the first or second protruding portions 38a and 38b. It is appreciated that the rough surface can include elements affixed to the wall of the first and second protruding portions 38a and 38b, such as particles affixed thereto. As a result, the water is urged to flow through the filtering media and is thus filtered thereby. Reference is now made to FIG. 2B, according to another example, the filtering member 60 can include a threaded wedge wire 62 having a sloped portions 68a and an opposing sloped portion 68b such that filtering volumes 64 are formed between adjacent portions of the threaded wedge wire 62. Each portions of the threaded wedge wire 62 defines a sloped portions 68a of one filtering volume 64 on one side thereof, and an opposing sloped portions 68b of an adjacent filtering volume 64 on a second side thereof.

The operation of the filtering media (not shown in FIG. 2B) inside the filtering volumes 64 is the same as that of the filtering media 52 of FIGS. 3A and 3B. It is appreciated however, that the threaded wedge wire 62 allows disposing elongated fibers on inside the filtering volumes 64 by disposing fibers, for example on a spool, on a filtering volumes 64 at the edge of the filtering member 60 and rotating the latter such that the fiber is winded about the filtering member.

It is appreciated that in order to form a filtering volume having a varying cross section, such that the density of the filtering media therein can vary, the filtering volume can have a trapezoid cross section as shown in FIGS. 3A and 3B. It is appreciated however that according to an example only one side of the filtering volume is sloped while the other side is perpendicular to the outer face of the filtering member, such that a right trapezoid cross section is formed. In addition the cross section of the filtering volume can be acute trapezoid or obtuse trapezoid configured such that the cross sectional area of the filtering volume adjacent the outer face is larger than the cross sectional area of the filtering volume adjacent the outlet face. This way, the density of the filtering medium is higher when it is urged by fluid flow or by pressure towards the outlet face.

Although the filtering media as described hereinabove can include fibers winded over the frame 35, according to other examples the filtering media can include filtering particle, such as charcoal etc., disposed inside the filtering volume. It is appreciated that in case the filtering media includes discrete particles the filtering volume can be provided with a suitable screen for maintaining the particles inside the filtering volume, as known. The varying cross sectional area of the filtering volume as disclosed herein above allows controlling the density of the particles, and to thereby control the displacement of dirt particles entrapped therein.

As shown in FIG. 3B, the wedge member 37 can be configured in accordance with the desired required density of the filtering media. That is to say, the width (here denoted as C) of the fluid path formed between the wedge member 37 determines the density of the filtering media during the inlet state. The width (here denoted as B) of the base of each wedge portion 37 determines the active area of the filter member, i.e. the total area of the inner face 36b through which fluid can enter flow. That is to say, the width (B) of the base of the wedge members 37 determines the area of the filter member through which fluid cannot flow into the inner volume 34 of the cylindrical filtering member 30.

The distance between the edges of adjacent wedge members 37 (here denoted as E) at the outer face 36a determines the area of the filtering volume 52 in which filtering media 58 can scatter, in the outlet state. Due to the sloped portion of the wedge members 37 between the inner face 36b and the outer face 36a, the height (here denoted as A) and the size of the angle (here denoted as D), of each of the wedge members 37 determine the difference between the width C and the width E and as a result the difference between the density at the inlet state and the density at the outlet state.

Reference is made again to FIG. 1B, the filtering member 30 is disposed inside the filtering apparatus 10, such that in the inlet state, fluid flow from the inlet port 12 towards the inner volume 34 of the cylindrical filtering member 30 urges the filtering media inside the filtering volume 52 to the inlet state thereof. I.e. the filtering media is urged towards the inner face 36b of the filtering member 30. The relatively small area of the filtering volume at the inner face causes the filtering media to dense in close proximity to the inner face 36b of the filtering member 30. Thus, the dense filtering media allow efficient filtering to the fluid. Filtered fluid flow can than flow towards the outlet port 14.

When one of the cleaning valves 18 is opened, the flow pressure therein urges fluid from the inner volume 34 of the filtering member 30 towards the cleaning valve 18. Thus the negative pressure gradient across the respect portion of the filter member 30 urges the filtering media to the outlet state. I.e., the filtering media is urged towards the outer face 36a of the filtering member 30. Due to the relatively large cross sectional area at the outer face 36a of the filtering member 30 the density of the filtering media is reduced such that dirt particles inside the filtering media can be washed out of the filtering volume towards the cleaning valve 18.

It is appreciated that different portions of the filtering member 30 can simultaneously operate in different state. That is to say, a portion of the filtering member 30 residing in close proximity to the inlet port 12, can operate in the inlet state due to the positive pressure gradient between the inlet port 12 and the inner volume 34 of the filtering member 30. On the other hand, however, a portion of the filtering member 30 residing in close proximity to the cleaning valve 18, can operate in the outlet state due to the negative pressure gradient between the cleaning valve 18 and the inner volume 34 of the filtering member 30.

Thus, the filtering apparatus 10 of the present application allows for continuous filtering operation of the filtering member 30 while the latter is cleaned. Accordingly, the filtering apparatus 10 allows an inlet flow from the inlet port 12 while the cleaning valve 18 are opened. The cleaning process of the filtering member 30 by using the cleaning valve 18 does not require a reverse flow, and can be carried while fluid enters the filtering apparatus 10 through the inlet port 12.

It is further appreciated that cleaning valves 18 can be opened one after the other, as opposed to opening thereof at the same time. This way, the negative pressure gradient caused by opening thereof does not interfere with the flow of the fluid from the inner volume 34 of the filtering member 30 towards the outlet port 14.

According to another example of the presently disclosed subject matter the filtering apparatus 10 can be cleaned by a backwash flow in which water or other fluid is fed through the outlet port 14 while the inlet port 12 is closed. The backwash flow enters the inner volume 34 towards the cleaning valve 18 through the filtering member 30. This way, the fluid flow is directed from the inner face 36b of the filter member towards the outer face 36a. As a result the filtering media inside the filtering volume 52 is urged towards the outer face 36a of the filtering member 30. Due to the relatively low density of the filtering media around the outer face 36a, dirt particles inside the filtering media can be washed out of the filtering volume towards the cleaning valve 18.

It is further appreciated that the disposition of the cleaning valves 18, at the bottom of the cylindrical wall of the housing 20 along the length thereof, allows cleaning the entire length of the filtering member 30. The inlet port 12, on the other hand, is disposed on the opposing side of the filtering member 30, such that the positive pressure gradient at the portion of the filtering member 30 in close proximity to the inlet port 12 does not interfere with the negative pressure gradient at the portion of the filtering member 30 in close proximity to the cleaning valve 18.

Figure 4A:
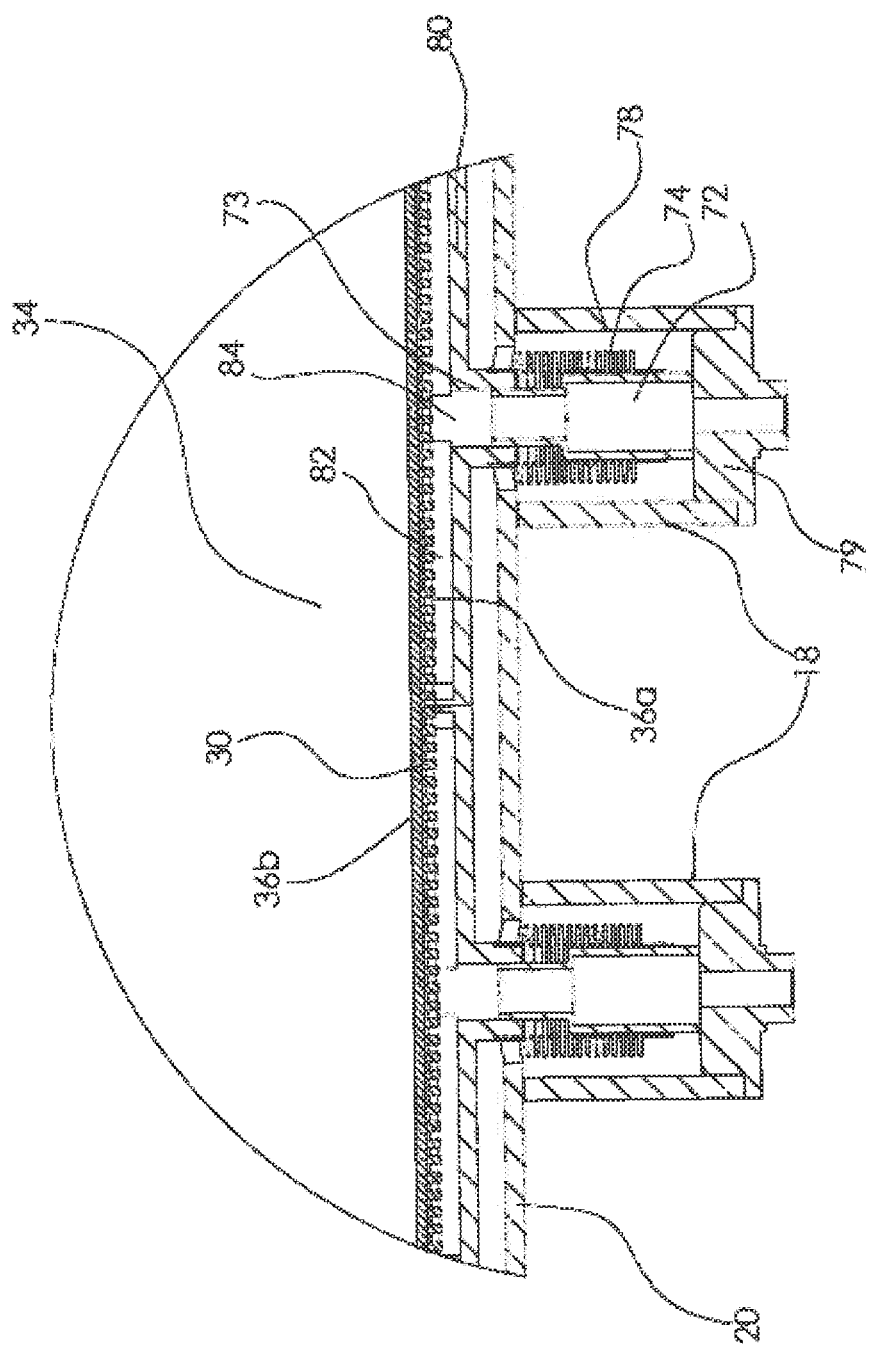
FIG. 4A is a side sectional view of the cleaning valves in accordance with an example of the presently disclosed subject matter, taken along lines A-A.

According to an example, the filtering apparatus 10 can be utilized with varying filtering properties. That is to say since the pressure gradient across the filtering member 30 causes the filtering media inside the filtering volume 52 towards the inner face 36b of the filtering member 30, the density of the filtering media can be determined by setting a predetermined pressure gradient across the filtering member 30. For example, if fine filtration is required, high pressure gradient can be formed across the filtering member 30 causing the filtering media to be highly dense at the inner face 36b, such that small undesirable particles are entrapped thereby. If on the other hand, the filtration required does not have to filter fine particles, a lower pressure gradient can be formed across the filtering member 30, such that the density of the filtering media is relatively lower, and only somewhat larger undesirable particles are entrapped thereby. Attention is now made to FIGS. 4A and 4B, the cleaning valves 18 can be configured as a proximity cleaning valve i.e. a valve which maintains constant engagement with the surface of the filtering member 30. This way, the filtering member 30 can be rotated while the stationary cleaning valve maintains close engagement with the outer face 36a thereof. For example the close proximity cleaning valve can include a suction nozzle assembly such as disclosed in WO 2011/058556 which is incorporated herein by reference. Thus the cleaning valve 18 can include tube 72 coupled to a pressure sink at a distal side thereof, a nozzle 73, a resilient element 74 which couples the nozzle 73 to a proximal side of the tube 72 and a deformable housing which bridges a gap between the proximal side of the tube and the nozzle. Each cleaning valves 18 can be further provided with a housing 78 and a bottom cover 79.

Accordingly, the cleaning valves 18 maintains a close engagement with the respective portion of the outer face 36a of the filtering member 30. That is to say, the rotation of the cylindrical filtering member 30 by the drive 40 allows the nozzle 73, in each rotations, to contact the entire circumference of one location along the outer face 36a of the filtering member 30. The resilient element 74 allows the nozzle 73 to maintain close engagement with the outer face 36a of the filtering member 30 during the rotation thereof. This way, fluid flow from the inner volume 34 of the filtering member 30 is directed to the opening 84 of the nozzle 73. Due to the shape of the filtering volume 52, the fluid flow into the cleaning valves 18 urges dirt particles therewith.

Figure 4B:
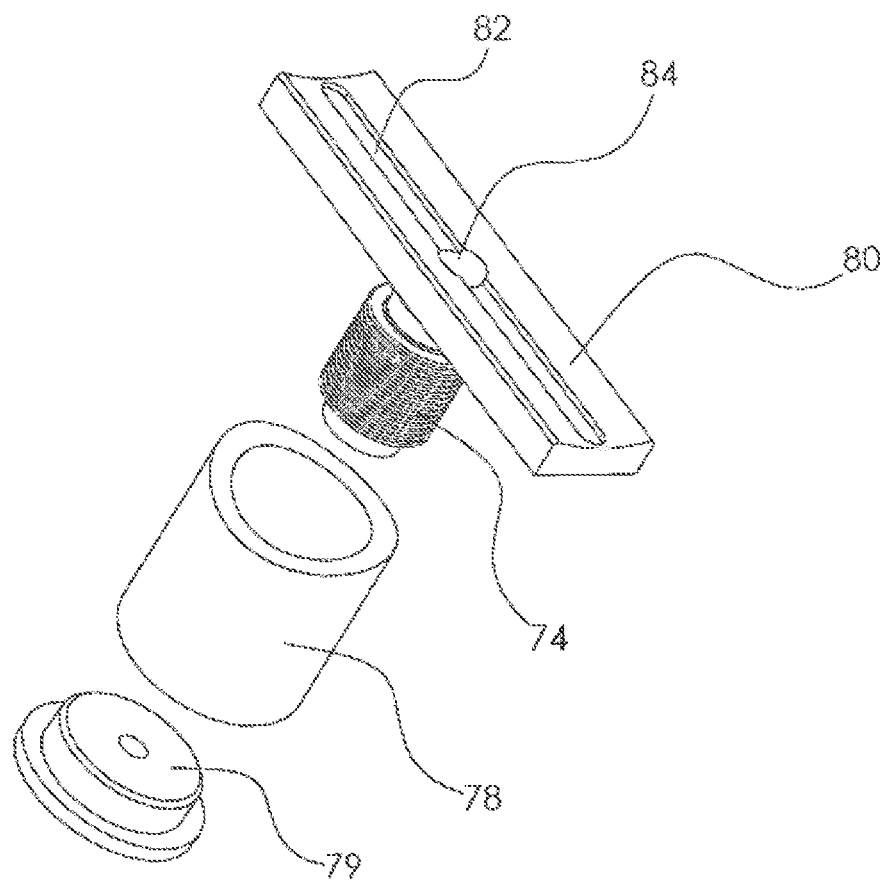
FIG. 4B is an exploded view of the cleaning valves of FIG. 4A.

As shown in FIG. 4B, the nozzle 73 of each cleaning valves 18 can be provided with a contacting member 80 mounted about the opening 84 of the nozzle 73, such that while the edge of the nozzle 73 engages a portion of the outer face 36a of the filtering member 30, the contacting member 80 engages the sides of that location. The contacting member 80 can be an elongated member and includes a channel 82 extending from the sides thereof towards opening 84. This way the contacting member 80 can be disposed along the length of the filtering member 30, such that fluid from the portion of the outer face 36a which are in contact with the contacting member 80 can flow through the channel 82 into the opening 84 of the nozzle 73.

It is appreciated that the cleaning valves 18 can be disposed along the length of the housing 20 such that the nozzles 73 engage locations along the length of the outer face 36a of the filtering member 30. The contacting members 80 can be configured such that each contacting member is disposed immediately adjacent a contacting member 80 of an adjacent nozzles 73. This way substantially the entire length of the filtering member 30 can be cleaned by fluid flow through the channels 82 and into the openings 84 of the nozzles 73. The rotation of the filtering member 30 thus allow cleaning the entire outer surface 36a thereof.

According to another example the cleaning valves can be configured as a static cleaning valve, i.e. without a resilient element. That is to say, the cleaning valve can be configured with a nozzle having a contacting member which is connected directly to a tube directing the fluid with the dirt practices out of the filter housing.

Those skilled in the art to which the presently disclosed subject matter pertains will readily appreciate that numerous changes, variations, and modifications can be made without departing from the scope of the invention, mutatis mutandis.

The invention claimed is:

1. A filtering member comprising:
a frame defining a fluid path between an outer face of said frame and an inner face thereof, said fluid path including first and second protruding portions extending between said outer face and said inner face defining a filtering volume therebetween, at least one of said first and second protruding portions being tapered such that a cross section of said filtering volume increases towards said outer face; and
a filtering media disposed in said filtering volume and configured such that, when fluid flows from said outer face towards said inner face, density of said filtering media is higher than density thereof when fluid flows from said inner face towards said outer face.

2. The filtering member of claim 1 further comprising an elongated member having a circumferential wall defining an inner volume therein.

3. The filtering member of claim 1 wherein each of said first and second protruding portions is a wedge member.

4. The filtering member of claim 3 wherein said frame includes a plurality of wedge members each of which defining a first and a second protruding portions coupled to one another and extending between said outer face and said inner face such that each of said filtering volume is delimited by a first protruding portion of one wedge member and a second protruding portion of an adjacent wedge member.

5. The filtering member according to claim 3 wherein said wedge member is a threaded wedge wire formed about said frame, being configured to allow winding elongated fibers inside said filtering volume.

6. The filtering member of claim 1 wherein a wall of said first protruding portion and said second protruding portion includes a rough surface configured to hinder fluid flow thereon.

7. The filtering member of claim 1 wherein said filtering volume includes a cross section having a trapezoid shape with a short base thereof disposed adjacent said inner face and a long base thereof disposed adjacent said outer face, such that said filtering volume expands towards said outer face.

8. The filtering member according to claim 1 wherein said filtering media comprises a plurality of fibers wound around said frame, between said first protruding portion and said second protruding portion.

9. The filtering member according to claim 1 wherein said filtering media is so disposed inside said filtering volume, such that when said filtering media is highly dense said filtering media does not occupy the entire filtering volume.

10. The filtering member according to claim 9 wherein filtering properties of said filtering media is configured to vary depending on the density thereof inside said filtering volume.

11. The filtering member according to claim 9 further configured to operate in an inlet state wherein pressure at said outer face is higher than that at said inner face, such that said filtering media is urged towards said inner face, and in an outlet state wherein pressure at said outer face is lower than that at said inner face such that said filtering media is urged towards said outer face allowing dirt particles inside said filtering volume to be washed out of said filtering volume.

12. The filtering member according to claim 11 wherein a width of said fluid path at said inner face is determined in accordance with the density of the filtering media required during said inlet state.

13. The filtering member according to claim 11 wherein a width of said fluid path at said outlet face is determined in accordance with the density of the filtering media required during said outlet state.

14. A filtering apparatus having housing in fluid communication with an inlet port and an outlet port, the apparatus comprising:
the filtering member of claim 1 disposed inside said housing,
wherein said filtering member is configured to allow fluid flow from said inlet port through said outer face of said filtering member towards said inner face thereof and to the outlet port.

15. The filtering apparatus according to claim 14 wherein said filtering member is an elongated member having a circumferential wall defining an inner volume said filtering member is so disposed inside the housing such that fluid from the inlet port flows through said circumferential wall into said inner volume.

16. The filtering apparatus according to claim 15 further comprising a drive configured for rotating said filtering member inside the housing.

17. The filtering apparatus according to claim 15 further comprising at least one cleaning valve mounted on the housing, wherein said filtering member is so disposed inside the housing such that fluid can flow from said inner volume of said filtering member through said inner face and said outer face into said cleaning valve, such that dirt inside said filtering volume is urged towards said cleaning valve.

18. The filtering apparatus according to claim 17 wherein said at least one cleaning valve includes a plurality of cleaning valves mounted along the length of the housing.

19. The filtering apparatus according to claim 17 wherein said at least one cleaning valve includes a tube coupled to a pressure sink at a distal side thereof, a nozzle, and a resilient element which couples said nozzle to a proximal side of said tube, and a deformable housing which bridges a gap between said proximal side of said tube and said nozzle.

* * * * *